United States Patent
Kibler et al.

(10) Patent No.: US 6,853,768 B2
(45) Date of Patent: Feb. 8, 2005

(54) OPTICAL CONNECTOR SYSTEM FOR DATA BUSSES

(75) Inventors: Thomas Kibler, Unteressendorf (DE); Joerg Moisel, Neu-Ulm (DE); Manfred Rode, Senden (DE); Eberhard Zeeb, Ulm (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 10/158,461

(22) Filed: May 30, 2002

(65) Prior Publication Data

US 2002/0181863 A1 Dec. 5, 2002

(30) Foreign Application Priority Data

Jun. 1, 2001 (DE) .......................................... 101 26 756

(51) Int. Cl.⁷ ................................................ G02B 6/28
(52) U.S. Cl. .......................... 385/33; 385/24; 385/48; 385/47
(58) Field of Search ........................ 385/24, 27, 33–35, 385/39, 44–51

(56) References Cited

U.S. PATENT DOCUMENTS

| | | | | | |
|---|---|---|---|---|---|
| 3,901,582 A | * | 8/1975 | Milton | .......................... | 385/44 |
| 4,173,390 A | * | 11/1979 | Kach | ............................ | 385/44 |
| 4,732,446 A | * | 3/1988 | Gipson et al. | ................ | 385/24 |
| 5,757,994 A | * | 5/1998 | Schoenwald et al. | ......... | 385/44 |
| 6,097,864 A | * | 8/2000 | Kropp | .......................... | 385/44 |

FOREIGN PATENT DOCUMENTS

| | | | | | |
|---|---|---|---|---|---|
| EP | 234981 A1 | * | 9/1987 | ............ | G02B/6/28 |
| JP | 63172104 A | * | 7/1988 | ............ | G02B/6/28 |
| JP | 11202150 A | * | 7/1999 | ............ | G02B/6/26 |
| JP | 2000231034 A | * | 8/2000 | ............ | G02B/6/32 |
| JP | 2000338427 A | * | 12/2000 | ............ | G02B/26/08 |

* cited by examiner

Primary Examiner—Akm E. Ullah
Assistant Examiner—Scott Alan Knauss
(74) Attorney, Agent, or Firm—Pendorf & Cutliff

(57) ABSTRACT

The invention concerns an optical connector system for data busses, in which optical elements are integrated in the connector and in the connector socket for redirecting the light. With this connector system the light guided along the bus line is decoupled to the optical receiver of a supplemental bus participant and the light transmitted from the supplemental participant is coupled into the bus line. The connector socket is either integrated in the bus line or a bus bridge is subsequently added to the bus line.

12 Claims, 2 Drawing Sheets

OPTICAL CONNECTOR SYSTEM FOR DATA BUSSES

BACKGROUND OF THE INVENTION

1. Field of the Invention

The invention concerns an optical connector system.

2. Description of the Related Art

Optical data bus systems have become more popular in recent years in the networking of buildings and in mobile systems (automobiles, airplanes, etc.). The optical physical bus structures have advantages in comparison to electrical systems, and above all with respect to their electro-magnetic compatibility and with regard to a high transmission band breadth. One problem with optical cabling is in the subsequent connection of additional users to the bus circuit. This requires either the interruption or cleaving of the bus circuit, which requires at least partial new cabling between until now adjacent bus participants, or alternatively the advance installation of expensive active signal generators which are later substituted with the additional participants.

On the basis of increased costs, above all in mobile systems, no active signal generators are employed in ring busses or linear busses. In the employment of optical ring busses there are provided at predefined positions on the bus line, in part, so-called passive in-line connectors or plugs, which causes additional insertion attenuation. For a later connection of participants the connectors must be separated, such that the transmission and receiver lines of the new participants can be connected to the open plug ends. The plugging in or unplugging of individual bus participants to or from the data bus without mechanical changes at the bus line or at the plug connections is not possible.

SUMMARY OF THE INVENTION

The task of the invention is thus comprised therein, of providing an optical connector system for data busses, which makes possible the connection of a participant or user to an optical ring bus or a linear optical bus and which makes possible the connecting or disconnecting of individual bus participants to or from the data bus without mechanical changes to the bus line or at the connection points.

The invention begins by having, integrated in the plug and in the plug socket, optical elements for detouring or reflecting light, which decouple the light, guided along the bus line, to the optical receiver of the individual bus participant, and which again reintroduce or couple-in the transmitted light of the supplemental participant again into the bus line. The connection socket may pre-exit at a predefined location in the bus line, or else a bus bridge may be introduced as retrofit in the bus line.

The invention has the advantage that, in the connector socket, a plug for connection of a further bus participant can be plugged in, without mechanical manipulation of the existing bus line. The plug system is again releaseable and makes possible the so-called plug-and-play operation of an optical ring bus or a linear optical bus.

BRIEF DESCRIPTION OF THE DRAWINGS

The invention is described in the following on the basis of the illustrative examples with reference to the schematic drawings.

DETAILED DESCRIPTION OF THE INVENTION

Figure 1:
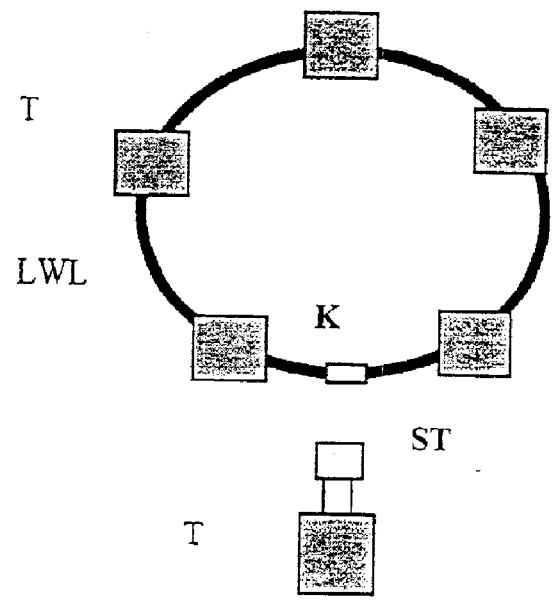
FIG. 1 shows a ring bus with pre-existing connection point K.
Figure 2:
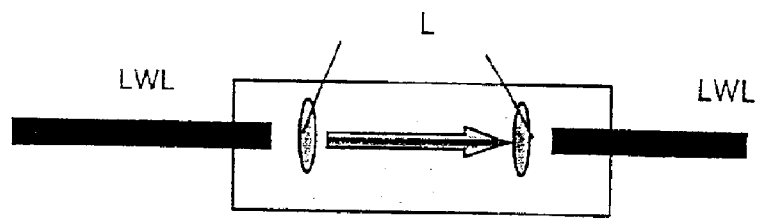
FIG. 2 shows the connector socket of the connection point with lens optics L.

For the inventive connector system there is employed for example a duplex plug with integrated reflecting mirror and integrated lenses. In the bus line shown in FIG. 1 with different terminals T for participant connection a ready connection point K is provided, at which the light guide LWL is separated. A further terminal T is to be connected at the connection point via a connection socket. In order to keep the insertion dampening in the connector socket at the connection point K as small as possible, lenses L are provided at the respective ends of the light guide LWL, which produce a substantially parallel light beam or refocus the parallel light beam again onto the light guide (FIG. 2). Depending upon the quality or power of the employed optics or lenses, the insertion dampening of the connector sockets is kept small. The connector sockets make possible an uninterrupted transmission along the data bus line.

Figure 3:
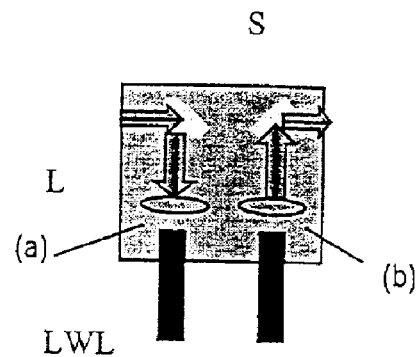
FIG. 3 shows a plug with integrated reflecting mirrors S and lens optics L.

Into the connector socket at the connection point there is plugged in, for example, the plug shown schematically in FIG. 3 for connection of a further bus participant without mechanical manipulation of the existing bus circuit or line, that is, without disassembling the bus line. In the connection plug small reflecting mirrors S are integrated, which decouple the light from the data bus line to the receiver line of the participant connection, or couple-in the transmission line of the participant connection onto the bus line. The light is conducted from the plug to the bus participant for example via light guides. In order to keep the insertion loss in the plug as small as possible, lenses L are provided, as shown in FIG. 3, at the respective ends of the light wave guides LWL for focusing of the light.

In a further embodiment electro-optical transformers, for example laser diodes, light diodes or photo-detectors, are provided at the points in the plug referenced in FIG. 3 with (a) and (b), which make possible an electrical plug connection with the bus participant.

The connector system can be disconnected or released at any time. With this connector system there results the so-called plug-and-play operation of an optical ring bus or a linear optical bus.

In further embodiments the connector socket includes deflection elements S, for example mirrors, wave guides, prisms or also diffractive or reflective optical elements, in order to decouple the light onto a receiver element or the light from a transmitter element from a supplemental added participant into the bus line. The following embodiments are achievable:

a) The connector socket contains two lenses and deflection elements. The decoupling of the light onto the receiver element or the coupling-in of the light from the transmission element of a supplemental added participant occurs without further optical elements.

b) The connector socket contains two lenses and deflection elements. The decoupling of the light onto the receiver element or the coupling-in of the light from the transmission element in the case of a supplemental added participant occurs via supplemental lenses.

c) The connector socket contains no lenses, however does contain deflector elements. The decoupling of the light onto the receiver element or the coupling-in of the light from the transmission element of a supplemental added participant occurs without further optical elements.

d) The connector socket contains no lenses, however it contains deflection elements. The decoupling of the light onto the receiver element or the coupling in the light from the transmission element of a supplemental added participant occurs via supplemental lenses.

Figure 6:
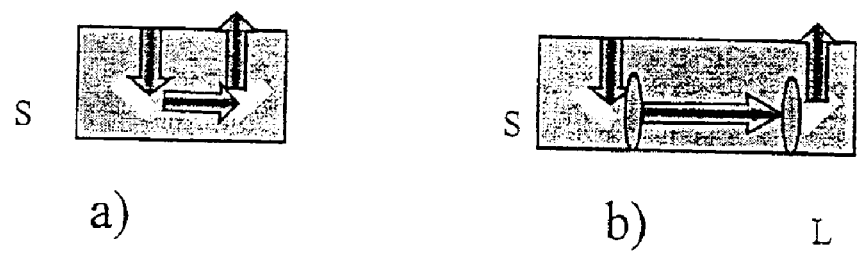
FIG. 6 shows a bus bridge with reflecting mirror S.

In the case of the removal of the participant from the bus line there is plugged in, in the embodiments a) through d), a passive bus bridge with integrated optical elements for redirecting and focusing light. In FIG. 6a one bus bridge with reflecting mirrors S is illustrated. FIG. 6b shows a bus bridge with reflecting mirrors S and lenses L for focusing the light beam.

Figure 4:
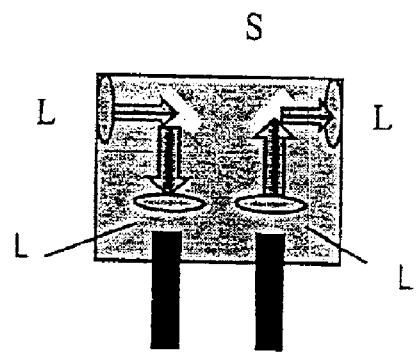
FIG. 4 shows a plug with integrated reflecting mirrors S and possible lens optics L.
Figure 5:
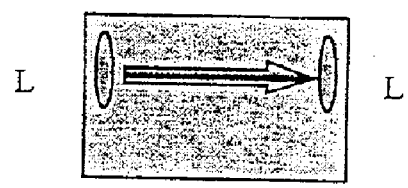
FIG. 5 shows a bus bridge without reflecting mirror.

In a further embodiment no predefined connection point in the optical bus line is provided. Prior to the connection of the plug the bus line is separated at any desired point. In order to keep the coupling losses as low as possible, a plug with an optical arrangement of four lenses L and two redirection mirrors S according to FIG. 4 is positioned adjacent the two light guides of the bus lines. If the plug is again removed from the bus line, a bus bridge with two lenses L according to FIG. 5 or wave guides is inserted in the bus line, in order to bridge over the interruption in the bus line.

The invention is not limited to the above described embodiments, but rather electromagnetic waves in the visible and outside the visible spectral range can be guided in the connector system.

What is claimed is:

1. An optical connector system comprised of at least one connector plug and one connector socket for the connection of a participant to an optical bus line, comprising:
   a connector socket adapted for connection in the bus line and adapted for receiving a connector plug (ST) of a supplemental bus participant, and
   a connector plug,
   wherein optical elements (S, L, LWL) are integrated in the connector plug and/or in the connector socket for the redirecting and focusing of light, which optical elements are arranged to (a) decouple light guided in the light guide (LWL) of the bus line and redirect it to an optical receiver of the supplemental bus participant and (b) couple-in light transmitted from the supplemental participant into the bus line,
   wherein the connector socket contains two lenses and redirection elements, which are arranged in such a manner, that the decoupling of the light onto a receiver element of a supplemental participant, or the coupling-in of the light from a transmitter element of a supplemental participant via the plug, occurs without further optical elements, and
   wherein upon removal of the plug, a passive bus bridge with integrated optical elements (L, S) for light deflection and focusing is plugged in the connector socket.

2. An optical connector system according to claim 1, wherein the connector socket contains two lenses (L), which focus the light in such a manner, that when the socket contains no plug the light is transmitted without interruption along the bus line.

3. An optical connector system according to claim 1, wherein reflecting mirrors (S) or wave guide (LWL) are integrated in the plug, and wherein the plug, when plugged in, is positioned between two lenses (L) of the connector socket.

4. An optical connector system according to claim 1, wherein the connector socket contains two lenses and redirection elements, which are arranged in such a manner, that the decoupling of the light onto the receiver element of a supplemental plugged in participant or the coupling-in of the light from the transmitter element of a supplemental plugged in participant via the plug occurs with supplemental lenses.

5. An optical connector system according to claim 1, wherein the connector socket essentially contains redirection elements, which are arranged in such a manner, that the decoupling of the light onto a receiver element of the supplemental participant or the coupling-in of the light out of a transmitter element of the supplemental participant via the plug occurs with supplemental lenses.

6. An optical connector system according to claim 1, wherein the plug contains light guide connectors.

7. An optical connector system according claim 1, wherein electro-optical transformers are integrated in the plug.

8. An optical connector system comprised of at least one connector plug and one connector socket for the connection of a participant to an optical bus line, comprising:
   a connector socket adapted for connection in the bus line and adapted for receiving a connector plug (ST) of a supplemental bus participant, and
   a connector plug,
   wherein optical elements (S, L, LWL) are integrated in the connector plug and/or in the connector socket for the redirecting and focusing of light, which optical elements are arranged to (a) decouple light guided in the light guide (LWL) of the bus line and redirect it to an optical receiver of the supplemental bus participant and (b) couple-in light transmitted from the supplemental participant into the bus line,
   wherein the connector socket contains two lenses and redirection elements, which are arranged in such a manner, that the decoupling of the light onto a receiver element of a supplemental plugged in participant or the coupling-in of the light from a transmitter element of a supplemental plugged in participant via the plug occurs with supplemental lenses, and
   wherein upon removal of the plug, a passive bus bridge with integrated optical elements (L, S) for light deflection and focusing is plugged in the connector socket.

9. An optical connector system comprised of at least one connector plug and one connector socket for the connection of a participant to an optical bus line, comprising:
   a connector socket adapted for connection in the bus line and adapted for receiving a connector plug (ST) of a supplemental bus participant, and
   a connector plug,
   wherein optical elements (S, L, LWL) are integrated in the connector plug and/or in the connector socket for the redirecting and focusing of light, which optical elements are arranged to (a) decouple light guided in the light guide (LWL) of the bus line and redirect it to an optical receiver of the supplemental bus participant and (b) couple-in light transmitted from the supplemental participant into the bus line,
   wherein the connector socket essentially contains redirection elements, which are arranged in such a manner, that the decoupling of the light onto a receiver element of the supplemental participant or the coupling-in of the light out of a transmitter element of the supplemental participant via the plug occurs with supplemental lenses, and wherein upon removal of the plug, a passive bus bridge with integrated optical elements (L, S) for light deflection and focusing is plugged in the connector socket.

10. An optical bus system comprised of at least an optical bus line, separated at any selected position into two light guides, a connector socket connected to the two light guides, and a connector plug for the connection of a supplemental participant into the an optical bus system, wherein said connector socket is adapted for receiving said connector plug positioned in line with the two light guides of the bus line or, in the case of removal of the plug, a bus bridge bridging over the bus line, wherein optical elements are integrated in the connector plug and/or in the connector socket for the redirecting and focusing of light, which optical elements are arranged to (a) decouple light guided in light guide of the bus line and redirect it to an optical receiver of the supplemental bus participant and (b) couple-in light transmitted from the supplemental participant into the bus line, wherein upon removal of the plug a passive bus bridge with integrated optical elements (L, S) for light deflection and focusing is plugged in the connector socket.

11. An optical bus system according to claim 10, wherein four lenses (L) and two reflecting mirrors (S) are provided in the plug directly in front of the two light guides of the bus line.

12. An optical bus system according to claim 10, further comprising a bus bridge, wherein the bus bridge contains two lenses (L), to bridge over the interruption in the bus line.

* * * * *